United States Patent
Conmy et al.

(10) Patent No.: US 7,120,628 B1
(45) Date of Patent: Oct. 10, 2006

(54) SYSTEM AND METHOD FOR ENABLING A USER TO SUBSCRIBE TO UPDATES FROM INFORMATION SOURCES

(75) Inventors: Douglas Walter Conmy, Nashua, NH (US); Gail Elaine Strait, Chelmsford, MA (US); Damien Frederick Katz, N. Chelmsford, MA (US); Robert Shaver, Watertown, MA (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 09/345,448

(22) Filed: Jul. 1, 1999

(51) Int. Cl.
*G06F 7/00* (2006.01)
*G06F 15/00* (2006.01)

(52) U.S. Cl. .............. 707/4; 707/3; 707/5; 707/6; 707/10; 715/500; 715/500.1

(58) Field of Classification Search ............. 707/3–6, 707/10, 513, 2, 200; 709/219, 226, 227; 379/67, 100; 705/80
See application file for complete search history.

(56) References Cited

U.S. PATENT DOCUMENTS

| | | | | |
|---|---|---|---|---|
| 4,253,157 A | * | 2/1981 | Kirschner et al. | 707/104.1 |
| 5,311,572 A | * | 5/1994 | Friedes et al. | 379/67 |
| 5,666,526 A | * | 9/1997 | Reiter et al. | 707/2 |
| 5,708,780 A | * | 1/1998 | Levergood et al. | 709/229 |
| 5,740,362 A | * | 4/1998 | Buickel et al. | 707/10 |
| 5,761,662 A | * | 6/1998 | Dasan | 707/10 |
| 5,764,899 A | * | 6/1998 | Eggleston et al. | 709/203 |
| 5,832,208 A | * | 11/1998 | Chen et al. | 709/206 |
| 5,855,014 A | * | 12/1998 | Smith | 707/3 |
| 5,870,717 A | * | 2/1999 | Wiecha | 705/26 |
| 5,892,909 A | * | 4/1999 | Grasso et al. | 709/201 |
| 5,913,032 A | * | 6/1999 | Schwartz et al. | 709/213 |
| 5,913,215 A | * | 6/1999 | Rubinstein et al. | 707/10 |
| 5,923,845 A | * | 7/1999 | Kamiya et al. | 709/206 |
| 5,953,732 A | * | 9/1999 | Meske, Jr. et al. | 707/513 |
| 5,963,618 A | * | 10/1999 | Porter | 379/88.18 |
| 5,978,833 A | * | 11/1999 | Pashley et al. | 709/231 |
| 5,987,454 A | * | 11/1999 | Hobbs | 707/4 |
| 6,020,980 A | * | 2/2000 | Freeman | 358/402 |
| 6,038,601 A | * | 3/2000 | Lambert et al. | 709/226 |
| 6,044,205 A | * | 3/2000 | Reed et al. | 707/1 |
| 6,044,372 A | * | 3/2000 | Rothfus et al. | 707/10 |
| 6,047,323 A | * | 4/2000 | Krause | 709/227 |
| 6,049,796 A | * | 4/2000 | Siitonen et al. | 707/3 |
| 6,061,681 A | * | 5/2000 | Collins | 707/5 |
| 6,078,924 A | * | 6/2000 | Ainsbury et al. | 707/101 |
| 6,094,655 A | * | 7/2000 | Rogers et al. | 707/10 |
| 6,101,531 A | * | 8/2000 | Eggleston et al. | 709/206 |

(Continued)

*Primary Examiner*—Jean M. Corrielus
*Assistant Examiner*—Anh Ly
(74) *Attorney, Agent, or Firm*—Pillsbury Winthrop Shaw Pittman, LLP

(57) ABSTRACT

A system, method, and computer readable medium for providing a system user with information updates from web-based or non-web-based computer sources. The system enables a user to subscribe from a computer application (e.g., an electronic mail or calendar application) to information sources. The system presents the user with a subscription view that the user may use to create the subscription through the use of selectable criteria displayed in the subscription view. The user may input search criteria for performing a search of one or more databases. The system searches the databases accessed, and then retrieves the objects matching the search criteria. The system may then notify the user that objects matching the search criteria have been discovered, and store or present the objects.

33 Claims, 4 Drawing Sheets

U.S. PATENT DOCUMENTS

| | | | |
|---|---|---|---|
| 6,101,537 A * | 8/2000 | Edelstein et al. | 709/219 |
| 6,108,700 A * | 8/2000 | Maccabee et al. | 709/224 |
| 6,119,101 A * | 9/2000 | Peckover | 705/26 |
| 6,122,633 A * | 9/2000 | Leymann et al. | 707/10 |
| 6,125,388 A * | 9/2000 | Reisman | 707/10 |
| 6,141,653 A * | 10/2000 | Conklin et al. | 705/1 |
| 6,278,993 B1 * | 8/2001 | Kumar et al. | 707/3 |
| 6,292,835 B1 * | 9/2001 | Huang et al. | 707/201 |
| 6,343,311 B1 * | 1/2002 | Nishida et al. | 709/203 |
| 6,366,899 B1 * | 4/2002 | Kernz | 707/1 |
| 6,374,252 B1 * | 4/2002 | Althoff et al. | 707/102 |
| 6,442,549 B1 * | 8/2002 | Schneider | 707/10 |
| 6,571,234 B1 * | 5/2003 | Knight et al. | 707/3 |
| 6,587,547 B1 * | 7/2003 | Zirngibl et al. | 709/217 |
| 6,611,862 B1 * | 8/2003 | Reisman | 709/217 |
| 6,643,666 B1 * | 11/2003 | Kernz | 707/104.1 |
| 2005/0044280 A1 * | 2/2005 | Reisman | 710/1 |

* cited by examiner

Basics

Subscription name: [Enter a subscription name] — 102

Retrieval

Retrieve what new or modified documents:  ○ All
                                          ● Those matching the selection criteria
                                       104 ○ Those matching the selection formula (advanced)

Retrieve documents where:

[X] Authors [Contain the text ▽]
 106
     [Enter words or word fragments. (ex. "fred" would match authors named "fred" "frederick")]

[X] Subject [begin with ▽]
 108
     [Enter words or word fragments. (ex. "pay" would match both "pay" and "paycheck")]

[X] Size [is less than ▽] [10] KB
 110

Documents must match: [Any of the above criteria] — 112

Selection Formula:

SELECT @Contains ( @LowerCase (@Author); ) !@Contains (@LowerCase (Subject); )

114              118                                                116 — [Check Syntax]

— 100

Status

Last checked time: N/A

Last checked server: N/A      — 120

[ ] Temporarily disable this subscription

Additional Information

SYSTEM AND METHOD FOR ENABLING A USER TO SUBSCRIBE TO UPDATES FROM INFORMATION SOURCES

FIELD OF THE INVENTION

The invention relates to a system for subscribing to information updates from network-based and non-network-based information sources. More particularly, the invention relates to a system for providing updates from network-based and non-network-based information sources based on criteria selected by a user.

BACKGROUND OF THE INVENTION

Staying informed of current developments in a particular area of expertise is important for many disciplines. The manual process of having to search for and read recent publications, however, is very cumbersome and time consuming. Often, people are unable to dedicate time to perform this process and may not be able to stay abreast of changes in a particular area.

Systems have been developed which attempt to automate the process of delivering updated information related to a particular field to one or more system users. Such systems may be used in a client/server architecture having one or more users connected over a network to one or more databases, such as server databases. Present systems generally perform a search of these databases to determine objects containing desired information.

Some systems, however, are dedicated to on-line information providers that publish information relating to various fields of endeavor. A user of a network system may access an information provider and request that information related to, for example, a particular topic, be forwarded to the user (e.g., via electronic mail) upon publication. This type of delivery may be included in systems utilizing "push" technology. In this manner, the user is notified of reports related to that topic upon its publication by the provider.

Such systems are limited to on-line information providers and are not capable of providing a user with updates from other sources of information. Present systems are also unable to determine whether information sources or computer applications (e.g., an electronic mail application) contain new information related to a particular topic and notify a user that such information exists.

These and other drawbacks exist.

SUMMARY OF THE INVENTION

An object of the invention is to overcome these and other drawbacks in existing systems.

Another object is to provide a system, method, and computer readable medium that automatically provides system users with current information from network-based and non-network based information sources.

Another object is to provide a system, method, and computer readable medium that automatically provides system users with updated information from network-based and non-network-based information sources and permits system users to determine a search criteria with which to retrieve the information.

These and other objects are achieved according to various embodiments of the invention. According to one embodiment, a system, method, and computer readable medium containing computer readable program code embodied therein are provided that enable a user to automatically receive information updates from network-based and non-network-based information sources.

The system may enable a user to request a "subscription" to information produced by one or more information sources accessed by a computer application. The subscription may contain a request for continuous updates to information related to a particular topic. The system presents a subscription request view to a user and enables the user to request one or more subscriptions. The system may also enable a user to input a search criteria for performing the search. Once input, the subscription is submitted to the system. After receiving the subscription, the system may perform periodic searches of the information sources accessed by the computer application to retrieve information satisfying the search criteria. The periodic updates received may be automatically presented to the user.

These and other objects, features, and advantages of the invention will be apparent to those having ordinary skill in the pertinent art from the detailed description of the preferred embodiments with reference to the figures.

BRIEF DESCRIPTION OF THE DRAWINGS

FIG. 1 is a schematic block diagram of a subscription view in accordance with an embodiment of the invention.

DETAILED DESCRIPTION OF THE PREFERRED EMBODIMENTS

Figure 2:
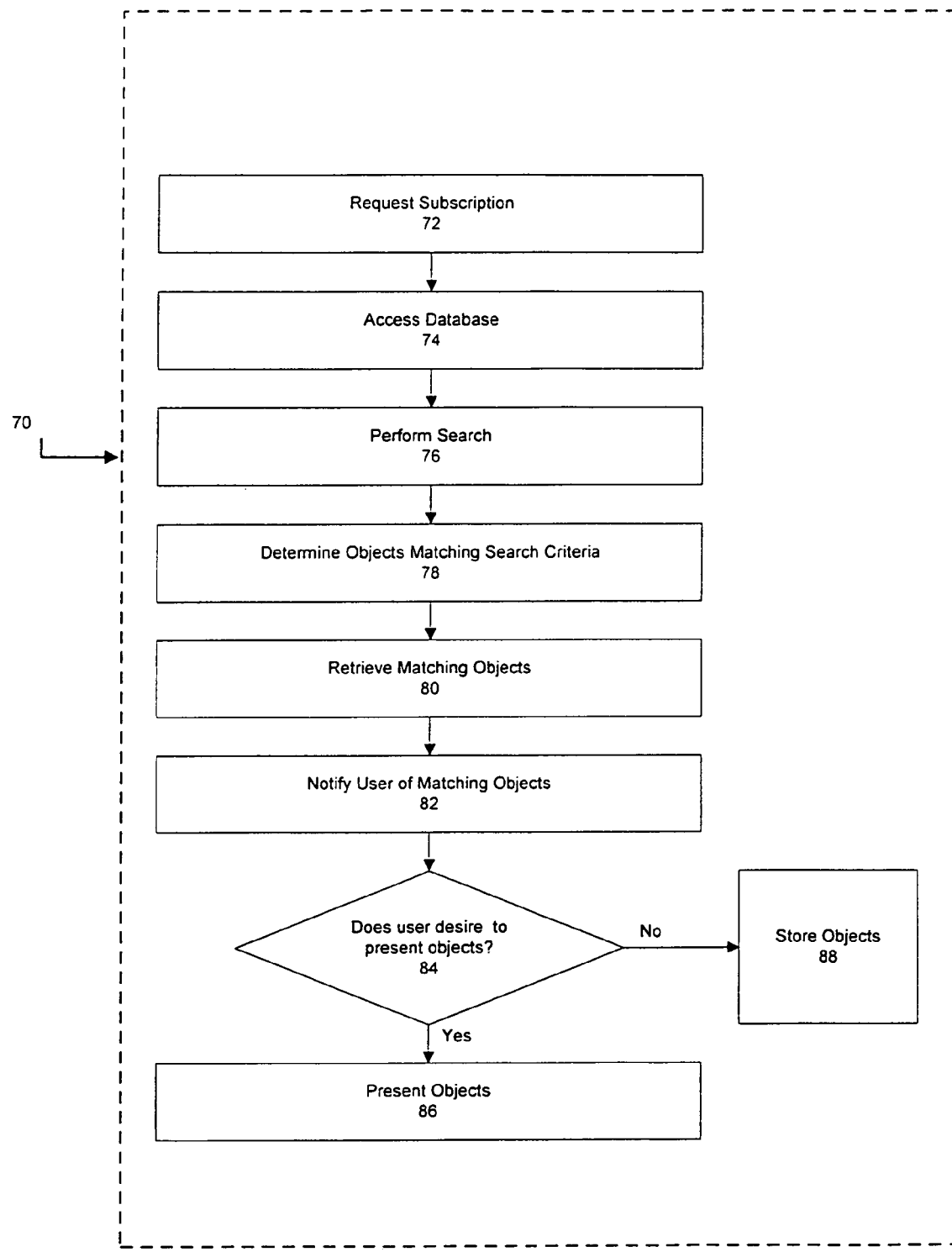
FIG. 2 is a schematic block diagram of a method of receiving a subscription in accordance with an embodiment of the invention.

According to the invention, the system enables a user to set-up one or more subscriptions from both network-based and non-network based information sources. Once set up, the user may then desire to periodically review the results. The subscriptions, which may be periodically updated, may thus be viewed through inputting various parameters because a user may not desire to see all of the results of a particular subscription.

For example, a user may subscribe to a World Wide Web site for sports information. The user may desire to periodically review the subscription for all articles written by a particular sports writer.

The invention may include a set of objects for information retrieval and related functions to filter and deliver desired updates from one or more databases. The objects may comprise software modules running on a general purpose programmed computer.

Accordingly, a graphical user interface, or view, may be provided. FIG. 1 is an illustration of a subscription view 100 in accordance with one embodiment of the invention. Subscription view 100 may include a subscription name field 102 which permits a user to input the name of a subscription. Subscription view 100 may also include an object option 104 for retrieving particular objects. For example, radio buttons may be used to identify information objects to be retrieved. The options may include options that enable the user to 1) retrieve all new or modified documents, 2) retrieve only those documents matching a particular selection criteria, and 3) retrieve only those documents matching a particular selection formula, etc.

Subscription view 100 may also comprise options 106, 108, 110 related, for example, to options that enable a user to specify the author, subject, and size of subscriptions, respectively. Options 106, 108, and 110 may include selectable parameters for each option. For example, author option 106 may include a pull-down menu comprising options that enable the user to select "contain the text," "include any of these names," "exclude all of these names," etc. Subject option 108 also may include selectable options such as "begins with," "has any of these words," or "has none of these words." Similarly, size option 110 may include "is less than," "is larger than," or "is equal to" as selectable options.

Additionally, a "Documents must match" field 112 may be included. "Documents must match" field 112 may comprise selectable criteria. For example, the selectable criteria may include "any of the above criteria," "all of the above criteria," etc. This criteria may be displayed as a pull-down menu or as various other known selectable mechanisms. If "Documents must match" field 112 is selected, all of the criteria specified must be satisfied in order for the information object in the database to be presented to the user.

If a user requests a subscription of only new or modified objects matching a selection formula, a selection formula field 114 may be provided in subscription view 100. A user may input, for example, lines of program code that identifies search criteria.

Furthermore, a "Check Syntax" function may be displayed as a selectable button 116. Check Syntax button 116 may be used to determine whether the code input in selection formula field 114 is correct. If the Check Syntax function determines that the syntax of the input code is correct, a message window (for example) may be displayed notifying the user that the code syntax is correct. If the Check Syntax function determines that there is at least one syntax error in the code, the system may display a message window notifying the user that at least one syntax error exists. Additionally, the system may identify the syntax error(s) in the input code and suggest possible corrections.

Subscription view 100 may also comprise a status field 118 indicating the most recently searched server and the time the server was searched. A "Temporarily disable this subscription" option 120 may also be included in status field 118 (or other location). "Temporary disable this subscription" option 120 may be used to discontinue a subscription for a period of time. Additionally, subscription view 100 may include an "Additional Information" field 122 which may display additional information relating to a particular subscription (e.g., a replica identification, selection formula used, etc.). Those of ordinary skill in the art recognize that various parameters and modes of display may be used. For example, all parameters may be shown with a corresponding selectable radio button and additional options may also be presented.

FIG. 2 illustrates a method 70 of setting up and receiving updated information according to a subscription established by a user. In step 72, the system requests a subscription from a database in accordance with search criteria input by a user. In step 74, the system accesses the database(s) corresponding to the user's subscription. In step 76, the system then performs a search for objects stored within the database(s) that match the search criteria. In step 78, the system then determines the objects which match the search criteria input by the user.

According to one embodiment of the invention, step 80 may periodically and automatically obtain information matching the search criteria. Step 80 may periodically perform searches for objects matching the search criteria on a random, user assigned, or system administrator assigned basis. For example, the user may instruct the system to perform a search on a weekly, daily, or hourly basis. The system performs the search at the designated intervals, then may automatically present the information matching the search criteria to the user, for example, on a "Welcome" page of a web browser.

According to another embodiment, step 80 retrieves the information objects from the subscriptions that match the search criteria from the database(s). The system may then notify the user in step 82 that objects matching the search criteria have been identified. In step 84, the system may inquire whether the user desires to present the matching objects immediately. This may be performed by displaying a message window comprising a question (e.g., "Do you want to view the matching objects now?"), with "yes"/"no" options. If a user selects yes, the system may present the matching objects in step 86. If the user selects no, the matching objects may be stored for later retrieval in step 88.

Figure 3:
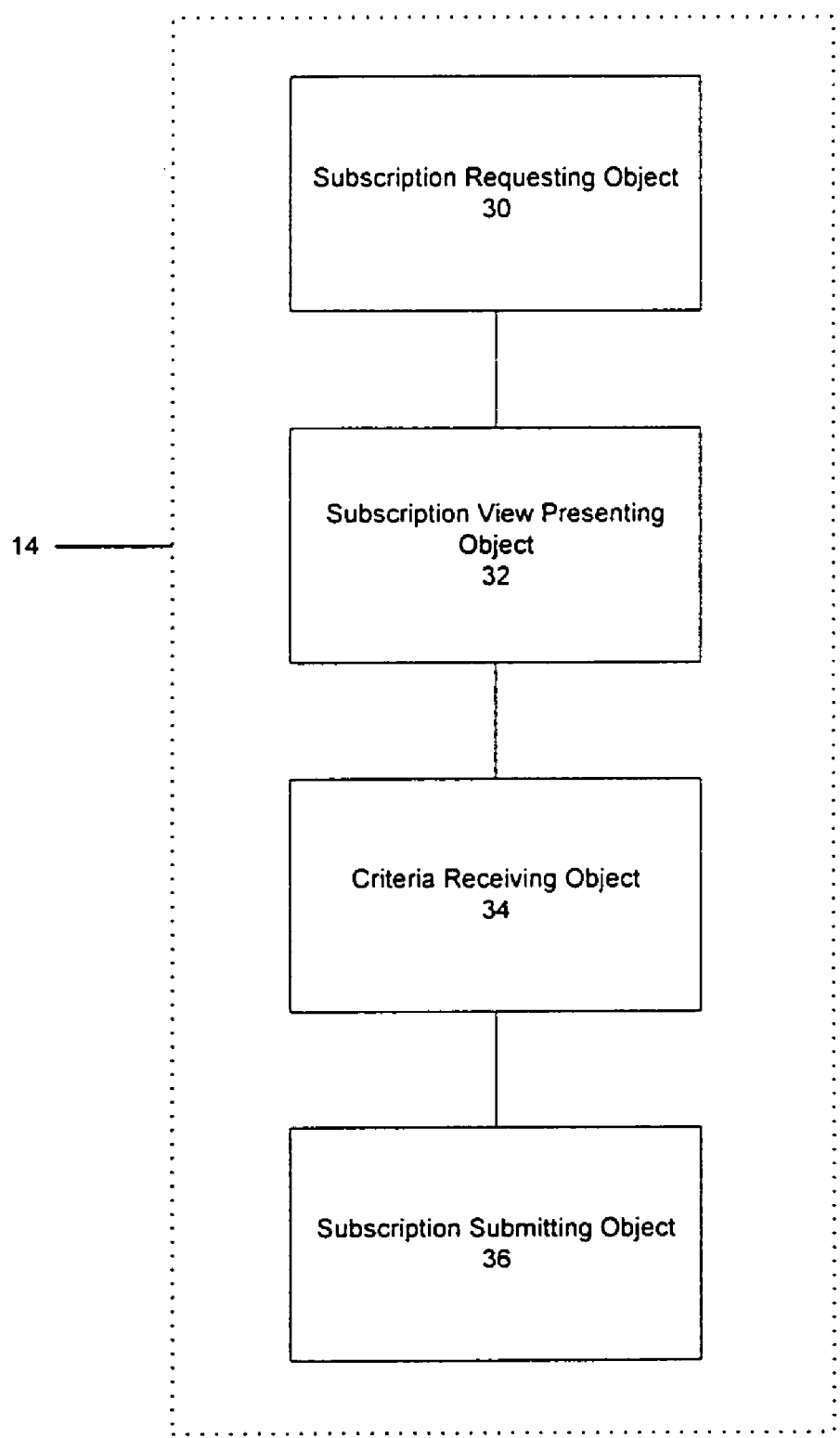
FIG. 3 is a schematic block diagram of an update system in accordance with an embodiment of the invention.

To perform the steps described above, an update system 14 (shown in FIG. 3) may be provided. To retrieve, scan and filter the information desired by the user, an update system 14 may perform periodic searches of fields within information objects stored in one or more databases to determine whether information objects match a user's criteria. These databases may be network objects or non-network databases. Update system 14 preferably includes a subscription requesting object 30. Subscription requesting object 30 requests a subscription for a user from one or more databases by communicating with a server over a communications link. After one or more subscriptions have been requested, a presenting object 32 may present a user with a subscription view (as shown in FIG. 5, for example). The subscription view may present a user with selectable criteria for performing update searches as discussed above.

A criteria receiving object 34 receives the search criteria input by the user. A subscription submitting object 36 submits the subscription to update system 14. Update system 14 may perform subscription validation by communicating with a server to confirm user account status, access rights, payment status or other requirements for establishing a valid subscription. After a subscription has been submitted and, if necessary, validated, update system 14 establishes a schedule to periodically perform searches (e.g., randomly or as determined by the user or a system administrator) of the corresponding database to identify objects which match the criteria of the subscription.

Figure 4:
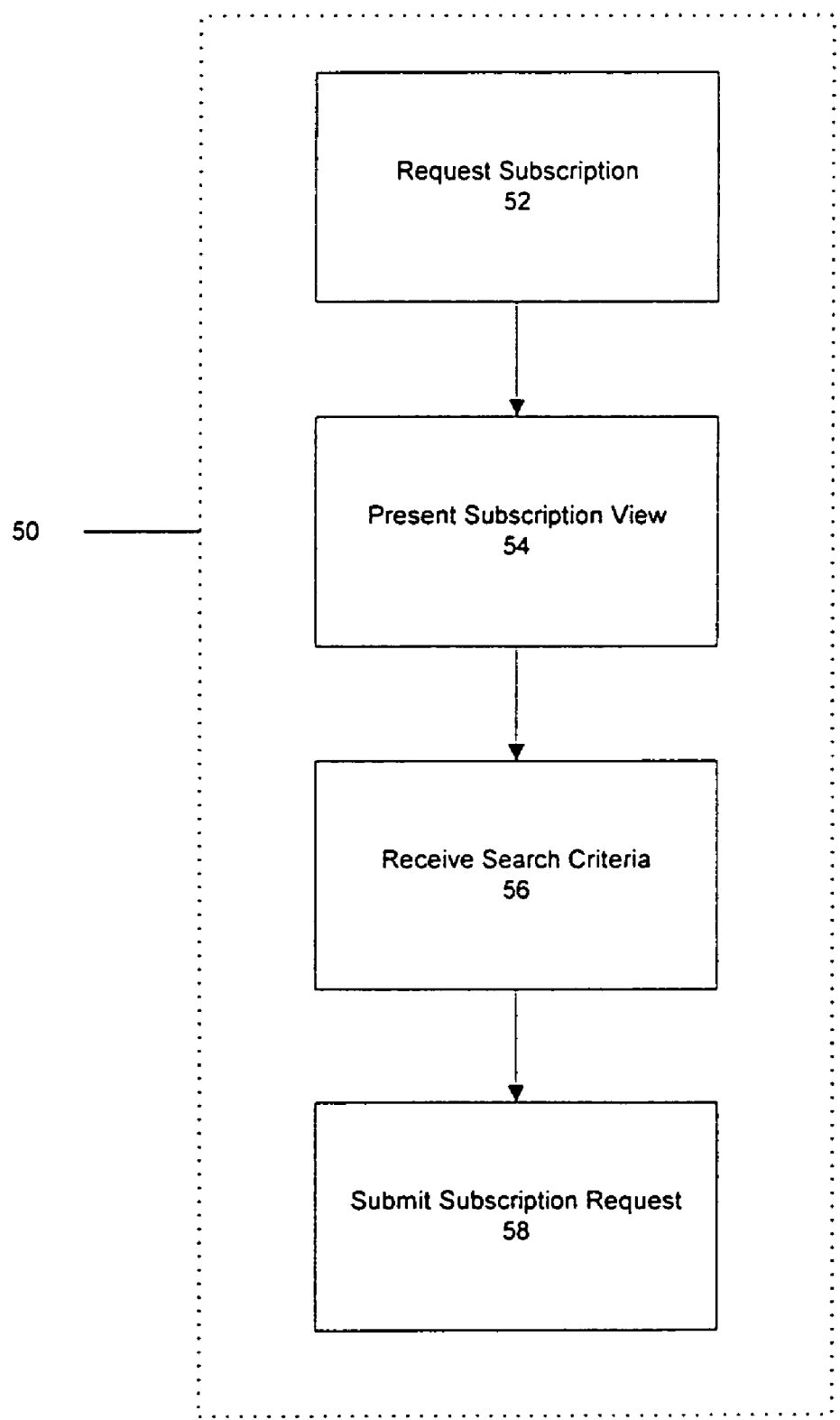
FIG. 4 is a schematic block diagram of a method of requesting updated information in accordance with an embodiment of the invention.

In terms of establishing the subscription, FIG. 4 illustrates a method 50 of requesting a subscription in accordance with one embodiment of the invention. In step 52, users request a subscription of one or more databases. For example, if the user is interested in sporting news, the database may be the Web site for Sports Illustrated™ or other sporting publications. After a subscription is requested, in step 54, a user may be presented with a view (typically on a computer monitor) that allows a user to input criteria for selecting which objects from the database are to be retrieved and forwarded to the user. In step 56, the system receives the criteria input by the user. In step 58, the system then submits the subscription to update system 14.

In accordance with one embodiment, the invention operates on a client/server system. The invention preferably accesses information objects stored in one or more databases, via a server. Databases may include, for example, software applications provided over a network, software applications stored on a local computer, files, documents, or other database. The system may perform a search of one or more databases, for example, servers located on the Internet, accessed by applications accessed by one or more clients to retrieve information requested by a user. Each client may comprise a personal computer running Windows™ 95, 98 or NT™, Unix™, Linux™ or other operating systems, as well as other computing or communications devices. Alternatively, each client may comprise individual threads running under a multitasking operating system on one computer. Update system 14 may be implemented as a software module running on a separate server, or similarly as an individual process thread on one computer along with clients. Update system 14 is a search and delivery engine providing users with periodically updated information regarding topics of selected interest. Update system 14 may be connected to a server via a communication link, which may be a dial-up modem connection, ISDN line, T1 or T3 digital connection, Ethernet, wireless, optical or other link.

The server may be in turn connected to one or more databases via a communications link, which may also be a dial-up modem connection, ISDN line, T1 or T3 digital connection, Ethernet, wireless, optical or other link. Each database may be a database residing for instance on hard disk, CD ROM, electronic memory or other storage media, contained within a server computer (not shown) or within information nodes in a local network, or other sources. It should be understood that a database may comprise a computer file, application, or other mechanism.

The server computer or other apparatus housing an object store may thus be an on-line resource connected to the Internet at an assigned http:// address, or a resource connected via a private intranet, a distributed database connected to a local area network, or connected in other fashions over a communications link to a server. It may be noted that in the implementation of the invention, it is not necessary, and update system 14 does not strictly expect, that database be solely an online database. When the database is an on-line source, in the context of delivery of updates over an Internet server may be deployed by an Internet service provider (ISP) via a PPP or SLIP connection. The database, however, may be a CD or DVD ROM, archival tape bank, or other off-line database connected as a peripheral to a client, as well as an on-line or off-line e-mail buffer, or any other accessible information source. It will again be appreciated that the invention operates with both Internet-based and non Internet-based information services.

According to a specific embodiment, a user may open a computer application, for example, an electronic mail or calendar application. The user may select, for example, a "Create" button from a pull-down field and select a "Subscription" option. A subscription form (for example, as shown in FIG. 5) is presented that permits the user to create a subscription, based on a selected search criteria, to that application. For example, if a user creates a subscription from a mail application, the user may create a subscription for electronic mail messages containing predetermined text, from a particular sender, or other criteria. For example, a user may create a subscription for electronic mail messages containing "fred" in the author line, the word "paycheck" in the subject line, or messages less than ten (10) kilobytes in size. As shown in object option 104 and "Documents must match" field 112, the subscription will retrieve only those documents matching any of the input criteria.

The system may then perform periodic searches randomly, at times assigned by the user or by other known mechanisms of electronic mail messages received to determine whether the messages contain the word "paycheck." If "paycheck" appears in a message, the update system notifies the user that a message containing the word "paycheck" has been received (e.g., by presenting the message or a portion thereof in a subscription window). Additionally, the update system may ask the user whether the message should be presented immediately.

According to one specific embodiment, update system 14 operates in the environment of Lotus Notes™ (developed by Lotus Development Corporation) under a function entitled "Subscriptions." According to one embodiment, Subscriptions and Lotus Notes™ may be operating on a Windows™ operating system licensed by the Microsoft Corporation. A Subscriptions icon may be presented in a navigation panel in Lotus Notes™. According to this embodiment, selecting the Headlines icon presents a Headlines window containing, for example, a list of subscriptions the user has created, the user's calendar application, a predetermined web site, etc., in various frames. A user may select the information to be displayed when the Headlines icon is selected. In the particular context of a Notes™ implementation, the storage of all forms of data, including database, electronic mail, word processing documents and others in a consistent file format (.NSF extension) permits particularly efficient searching through selected fields. That is, data can be tested against search criteria and target fields quickly and reliably since those data structures are well defined in that environment. Likewise is that environment, data can be readily stored in distributed copies of an overarching Notes™ file but readily shared and searched for updates by a variety of users throughout an enterprise. Preferably, update system 14 enables subscription view 100 to be configured according to a user's preference. For example, a user may select the number and arrangement of the frames to be searched or presented in the Notes™ context.

Update system 14 may be provided on a computer readable storage medium comprising computer readable code embodied therein and loaded onto a client. Various objects of the client may also be provided on a computer readable storage medium.

Other embodiments and uses of the invention will be apparent to those skilled in the art from consideration of the specification and practice of the invention disclosed herein. The specification and examples should be considered exemplary only. The scope of the invention is intended to be limited only by the following claims.

What is claimed is:

1. A system for enabling a system user to request a subscription of at least one non-web document from at least one database, comprising:

subscription requesting means for enabling a user to request a subscription of at least one non-web document from at least one database, the subscription requesting means including a selection formula, wherein the selection formula is programmed by the user, the selection formula including search criteria corresponding to the subscription, wherein the search criteria identify information to be searched for and presented to the user at various intervals;

subscription parameter receiving means for receiving at least one subscription parameter from the user that refines the information identified by the search criteria, wherein the at least one subscription parameter indicates a type of information to retrieve;

search performing means for performing a search of the at least one database for information matching the subscription at one or more of the various intervals without user intervention;

subscription retrieving means for retrieving the information matching the subscription; and subscription notification means for notifying the user of the retrieved information.

2. The system of claim 1, wherein the search performing means performs the search of the at least one database on a random basis.

3. The system of claim 2, wherein the search performing means performs the search on a random basis selected by the user.

4. The system of claim 1, further comprising option input means for enabling a user to input one or more options relating to the subscription.

5. The system of claim 1, wherein the at least one database is a Lotus Notes database.

6. The system of claim 1, further comprising subscription presenting means for presenting the subscription to the user.

7. The system of claim 6, wherein the subscription presenting means presents the subscription as an electronic mail message.

8. The system of claim 1, further comprising syntax checking means for determining whether code input in the programmed selection formula is correct.

9. The system of claim 1, further comprising subscription disabling means for temporarily discontinuing the subscription for a predetermined period of time.

10. The system of claim 1, wherein the search criteria corresponding to the subscription is an electronic mail message containing a predetermined text.

11. A system for enabling a system user to request a subscription of at least one non-web document from at least one database, comprising:

a subscription requesting object that enables a user to request a subscription of at least one non-web document from at least one database, the subscription requesting object including a selection formula, wherein the selection formula is programmed by the user, the selection formula including search criteria corresponding to the subscription, wherein the search criteria identify information to be searched for and presented to the user at various intervals;

a subscription parameter receiving object that receives at least one subscription parameter from the user that refines the information identified by the search criteria, wherein the subscription parameter indicates a type of information to retrieve;

a search performing object that performs a search of the at least one database for information matching the subscription at one or more of the various intervals without user intervention;

a subscription retrieving object that retrieves the information matching the subscription; and subscription notification means for notifying the user of the retrieved information.

12. The system of claim 11, wherein the search performing object performs the search of the at least one database on a random basis.

13. The system of claim 12, wherein the search performing object performs the search on a random basis selected by the user.

14. The system of claim 11, further comprising an option input object that enables a user to input one or more options relating to the subscription.

15. The system of claim 11, wherein the at least one database is a Lotus Notes database.

16. The system of claim 11, further comprising subscription presenting means for presenting the subscription to the user.

17. The system of claim 16, wherein in the subscription presenting means presents the subscription as an electronic mail message.

18. A method for enabling a system user to request a subscription of at least one non-web document from at least one database, comprising the steps of:

requesting a subscription for at least one non-web document from at least one database, wherein the request includes a selection formula programmed by a user, the selection formula including search criteria corresponding to the subscription, wherein the search criteria identify information to be searched for and presented to the user at various intervals;

receiving at least one subscription parameter from the user that refines the information identified by the search criteria, wherein the at least one subscription parameter indicates a type of information to be retrieved;

performing a search of the at least one database for information matching the subscription at one or more of the various intervals without user intervention;

retrieving the information matching the subscription; and notifying the user of the retrieved information.

19. The method of claim 18, further comprising the step of presenting the information to the user.

20. The method of claim 18, further comprising the step of periodically searching the at least one database.

21. The method of claim 20, wherein the step of periodically searching the at least one database is performed on a random basis.

22. The method of claim 21, wherein the step of periodically searching the at least one database is performed on a periodic basis selected by the user.

23. The method of claim 18, wherein the at least one database is a Lotus Notes database.

24. The method of claim 18, further comprising the step of presenting the subscription to the user.

25. The method of claim 24, wherein the presenting step presents the subscription as an electronic mail message.

26. A processor readable medium having processor readable code embodied therein for enabling a system user to request a subscription of at least one non-web document from at least one database, comprising:

subscription requesting processor readable code for causing a processor to request a subscription of at least one non-web document from at least one database, the subscription requesting processor readable code including a selection formula programmed by a user, the selection formula including search criteria corresponding to the subscription, wherein the search criteria identify information to be searched for and presented to the user at various intervals;

subscription parameter receiving processor readable code for causing a processor to receive at least one subscription parameter from the user that refines the information identified by the search criteria, wherein the at least one subscription parameter indicates a type of information to retrieve;

search performing processor readable code for causing a processor to perform a search of the at least one database for information matching the subscription at one or more of the various intervals without user intervention;

information retrieving processor readable code for causing a processor to retrieve the information matching the subscription; and subscription notifying processor readable code for causing a processor to notify the user of the retrieved information.

27. The medium of claim 26, wherein the search performing processor readable code performs the search of the at least one database on a random basis.

28. The medium of claim 27, wherein the search performing processor readable code performs the search on a random basis selected by the user.

29. The medium of claim 26, further comprising option input processor readable code for causing a processor to enable a user to input one or more options relating to the subscription.

30. The medium of claim 26, wherein the at least one database is a Lotus Notes database.

31. The medium of claim 26, further comprising subscription presenting processor readable code for causing a processor to present the subscription to the user.

32. The medium of claim 31, wherein the subscription presenting processor readable code presents the subscription as an electronic mail message.

33. A method for enabling a system user to request a subscription of at least one document from at least one database, comprising the steps of:

enabling a user to input a selection formula, said selection formula including search criteria corresponding to a subscription, wherein said search criteria identify information to be searched for and presented to the user at various intervals without user intervention that refines the information identified by the search criteria;

performing a search in said at least one database to identify the information corresponding to said search criteria of said selection formula;

retrieving said identified information; and presenting said retrieved information to the user.

* * * * *